April 16, 1968 V. ROMANO 3,378,838
SYSTEM FOR METERING THE NONAMBIGUOUS SPEEDS OF
THE TARGETS BY MEANS OF RADAR EMPLOYING TWO
OPERATIVE FREQUENCIES AND A COHERENT
MEMORY FILTER
Filed Dec. 12, 1966 3 Sheets-Sheet 3

Vincenzo Romano,
Inventor

By, Wenderoth, Lind & Ponack,
Attorneys 3,378,838
SYSTEM FOR METERING THE NONAMBIGU-
OUS SPEEDS OF THE TARGETS BY MEANS
OF RADAR EMPLOYING TWO OPERATIVE
FREQUENCIES AND A COHERENT MEMORY
FILTER
Vincenzo Romano, Rome, Italy, assignor to Selenia-Industrie Elettroniche Associate S.p.A., Rome, Italy
Filed Dec. 12, 1966, Ser. No. 601,192
3 Claims. (Cl. 343—7.7)

ABSTRACT OF THE DISCLOSURE

A method and apparatus for measuring the non ambiguous speed of targets by means of a pulsed radar system having a saw tooth generator operating with two different operative frequencies. A coherent memory filter allows the measure of the speed to be obtained by using the shift of the pips corresponding to the two measures of the ambiguous speed corresponding to said frequencies. The speed is measured by means of the determination of the distance between two pulses obtained from the two different operative frequencies by processing them in the coherent memory filter. The determination of the distance between the pulses is obtained by triggering and blocking the saw-tooth generator. Square wave signal generators are used for blocking.

The present invention relates to a system for measuring the non ambiguous speeds of targets by means of radar having two operative frequencies and a coherent memory filter.

Radar apparatuses are known wherein the relative speed of a target is determined by utilizing the Doppler shift and by processing the received signals in a coherent memory filter. These known systems have, however, the drawback of having a measurement interval of the non ambiguous speed which is relatively narrow. The present invention aims to provide a system for measuring the non ambiguous speed of the targets in a pulsed radar system employing two operative frequencies and provided with a coherent memory filter.

An object of the present invention is to use a coherent memory filter which sums a number of pulses received by a radar system having two different operative frequencies. This coherent memory filter is associated with a generator of square-wave signals and with a delay line, so as to separate the signals due to a first frequency from those due to a second frequency. These two signals are then brought to a saw tooth generator having its own period corresponding to the duration period of the transmitted pulses and arranged in circuit so as to be triggered by the pulse concerned with the first frequency and blocked by the pulse concerned with the second frequency.

The arrangement is such that the voltage reached by the saw tooth wave is proportional to the difference of the two Doppler frequencies associated with the two transmitted frequencies, consequently, it will be proportional to the speed of the target. Consequently, the non ambiguous measurement interval of the speed of the target will be far greater than the one obtained by the conventional arrangements.

The present invention will be described with reference to a preferred embodiment disclosed only by way of a non limitative example, and with reference to the embodiment of the various parts which can be either of the analog or digital types.

Figure 1:
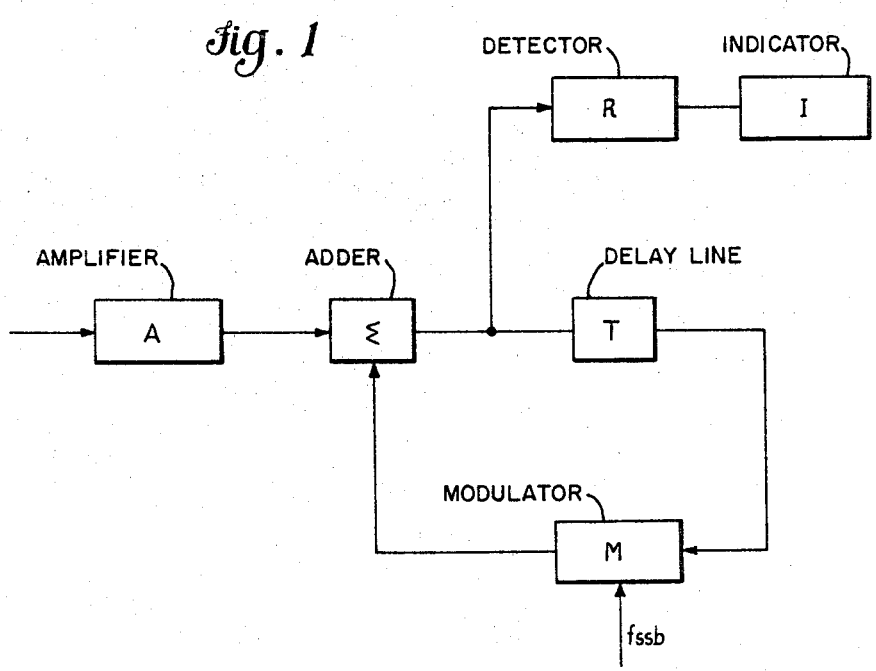
FIGURE 1 shows a block diagram of the pulse radar with two operative frequencies, provided with a coherent memory filter according to the present invention.

With reference to FIGURE 1, in a prior art radar system employing a coherent memory filter, the incoming signal coming from an amplifier A, for instance an intermediate frequency amplifier is brought to an adder $\Sigma$ and from there to a delay line J and then to a modulator which submits the carrier $f$ of the signal to a shift $f_{ssb}$, such that $f_{ssb} = 1/\tau$, wherein $\tau$ is the length of the received pulse. Finally, the signal coming from the modulator M is returned as another input to the adder $\Sigma$.

At a suitable point on the closed loop, the signal is taken and brought to a detector R and then to an indicator 1. The signal so obtained is caused to circulate N times along the loop.

The resulting signal is shorter than the incoming signal, and its position in time with respect to a pre-established origin, is related by the Doppler frequency contained in the incoming signal. Therefore, it is related to the relative speed of the target, apart from multiples of the ambiguous speed, which is generally very low and which corresponds to that speed wherein the Doppler frequency equals the repetition frequency of the pulses of the radar $f_{rip}$.

According to this invention the removal of the drawbacks due to said ambiguous speeds are obtained, thanks to the fact that the radar transmits on two frequencies $f_1$ and $f_2$. Therefore, the signals at both frequencies, resulting from reflections off of a target, are processed by the coherent memory filter and then shifted in time through an amount which depends upon the speed.

The signals deriving from the frequency $f_1$ are delayed and added to those deriving from the frequency $f_2$ so that for each target two corresponding pips will be located within the same resolution interval which is equal to twice the transmitted pulse and the distance of which depends upon the speed.

The Doppler frequencies $f_{d1}$ and $f_{d2}$, resulting from the two frequencies $f_1$ and $f_2$ transmitted, for a target moving with a radial speed $v$, are given as follows:

$$f_{d1} = \frac{2v}{c} f_1$$

$$f_{d1} = \frac{2v}{c} f_2$$

wherein $c$ is the speed of light. Consequently, the two corresponding ambiguous speeds are:

$$v_{amb_1} = \frac{c f_{rip}}{2 f_1}$$

$$v_{amb_2} = \frac{c f_{rip}}{2 f_2}$$

By measuring the distance between the two pips of the processed signals, which can be set out as:

$$f_{d2} - f_{d1} = \frac{2v}{c}(f_2 - f_1)$$

it is possible to measure, without ambiguity, any speed comprised between zero and the value $$\frac{c}{2} \frac{f_{rip}}{f_2 - f_1}$$

which is far greater than that for a single frequency.

Figure 2:
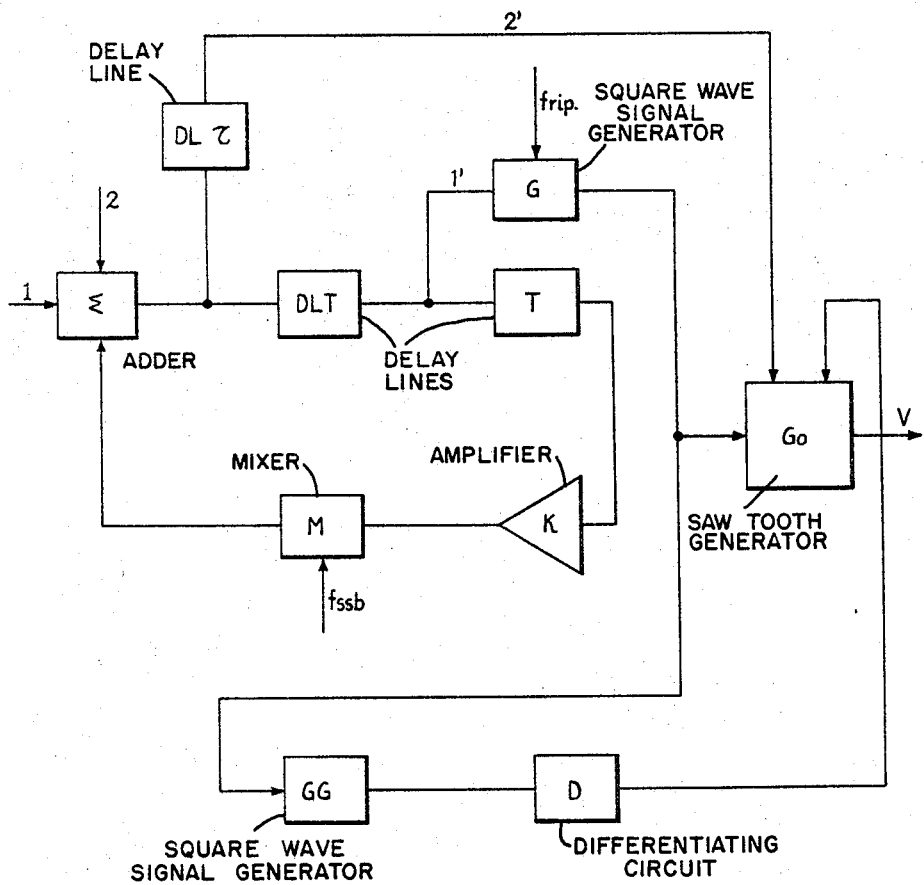
FIGURE 2 is a circuit block diagram.

In the block diagram of FIGURE 2, the circuit necessary for performing this operation has been shown. To the adder Σ come the signals derived from the two channels operating at the frequencies $f_1$ and $f_2$, after they are converted to the same intermediate frequency. It may be assumed, with no loss in the general statement, that the radar will transmit and receive in a period of the repetition frequency one signal at the frequency $f_1$ and in the subsequent period a second signal at the frequency $f_2$. The output signals from the adder Σ are carried to the coherent memory filter including a delay line with a period "T," shown by the block DLT, a second delay line with a period "T," shown by T, an amplifier K and a mixer M. The elements of said memory filter are arranged in a closed loop.

This coherent memory filter circuit adds a number of pulses depending upon the amplification coefficient K of the amplifier shown by the block K, having a value smaller than 1. In the mixer M, a frequency $f_{ssb}$, corresponding to a multiple of the pulse repetition frequency, will be added to the frequency of the pulse. On the two outputs 1' and 2' will be available the two signals deriving from the frequency $f_1$ and from the frequency $f_2$, respectively, after their passage through the coherent memory filter.

In the branch 1' a square-wave signal generator, shown by the block G, is inserted, and said generator is controlled by a trigger circuit, driven by a pulse repetition frequency signal $f_{rip}$, so that only the signals due to the frequency $f_1$ will pass. In the branch 2', a delay line DLτ is inserted, having a delay equal to the length of the pulse ($\tau$). The purpose of said delay is to cause the target signals due to the frequency $f_1$ to always precede those due to frequency $f_2$. The processed signals on the lines 1' and 2' are brought to a saw tooth generator $G_0$. Said generator; itself, having a period $\tau$ is triggered by the signals at the frequency $f_1$ and blocked by the signals at the frequency $f_2$.

Each pip pertinent to the frequency $f_1$ also causes square wave generator 66 to generate a square signal lasting twice the pulse length. The time derivative of said square signal, obtained through the differentiating circuit D, is used to block the generator $G_0$ so that if the pip pertinent to the frequency $f_2$ misses, the generator $G_0$ will be blocked.

The voltage V reaching the circuit $G_0$ in the presence of targets will be therefore proportional to the difference between the two Doppler frequencies $f_{d1}$ and $f_{d2}$, and consequently proportional to the speed of the target.

Figure 3:
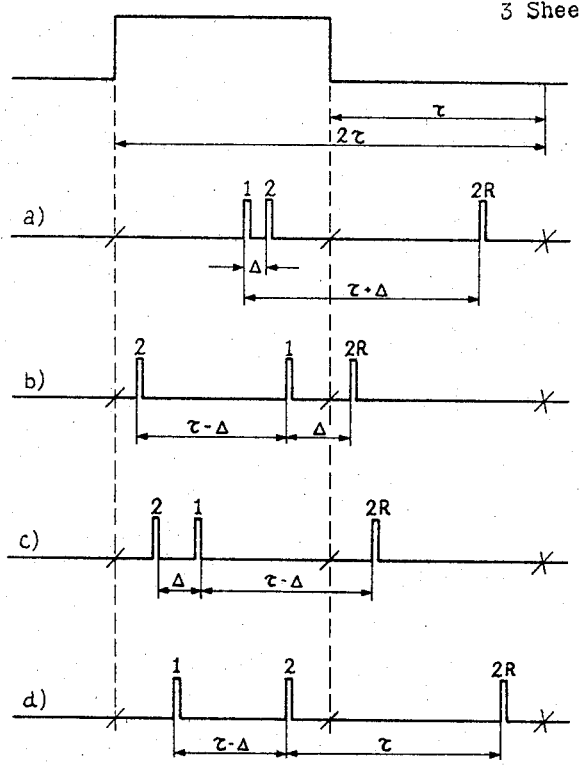
FIGURE 3 shows wave forms associated with the operation of the circuits of FIGURE 2.
Figure 4:
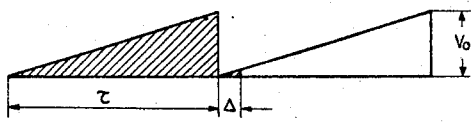
FIGURE 4 shows the saw tooth waveform supplied by the generator controlled by the pulses coming from the coherent memory filter.
Figure 4:
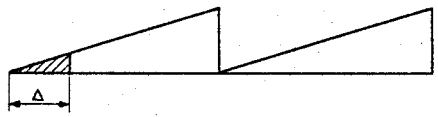
Figure 4:
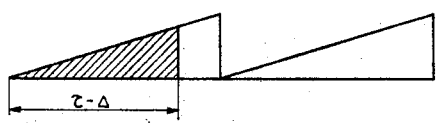
Figure 4:
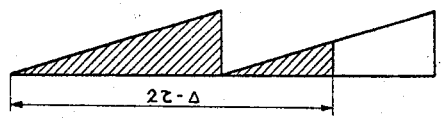

With reference to the FIGURES 3 and 4 it may be remarked that the voltage which constitutes the measure of the nonambiguous actual speed is proportional to the value of the distance Δ between the pulses or proportional to the value $\tau - \Delta$. Finally, the value of the output voltage from the sawtooth generator $G_0$, the value of which is $V_0$, will be smaller than $V_0/2$ for speeds concerning approaching targets and greater than $V_0/2$ for speeds concerning approaching targets and greater than $V_0/2$ for speeds concerning leaving targets.

The voltage so obtained can be used for the vertical deflection of the electronic beam of a cathode ray tube, the horizontal deflection of which shows the range of the target from the radar. On a cathode ray tube used as aforesaid, on the horizontal axis we shall have the range from the target, and on its vertical axis its speed.

The so obtained measurement of the target speed has an accuracy which can be improved by using the ambiguous data which is obtained directly from the position of the return pulse in the resolution interval after the signals have moved through the coherent memory filter. This system for displaying the nonambiguous speed of a target has been disclosed only by way of non-restrictive example of the scope of this invention. The skilled persons in the art could easily devise other systems for obtaining this indication. It is to be noted that two targets, the range of which are less than 2 which are moving either at the same speed or at different speeds, cannot be distinguished unless use is made of more saw tooth generators triggered with one another, and in this case it would be possible to better distinguish targets moving at different speeds, even if having under some conditions wrong indications as to their speed.

The present invention has been described with reference to a preferred embodiment. It is understood, however, that changes and modifications might be brought thereto without departing from the scope of the present industrial privilege.

I claim:

1. A method for measuring the nonambiguous speed of targets by means of a pulsed radar system having a saw tooth generator operating with two different operative frequencies and a coherent memory filter comprising allowing the measure of the speed to be obtained by using the shift of the pips corresponding to the two measures of the ambiguous speed corresponding to said frequencies and measuring the speed by means of the determination of the distance between two pulses obtained from said two different operative frequencies by processing them in said coherent memory filter, the determination of the distance between said pulses being obtained by triggering and blocking said saw tooth generator.

2. A method for measuring the nonambiguous speed of targets as claimed in claim 1, wherein the initial conditions are obtained as a result of a square signal generator being driven by one of said frequencies if the signal of the other frequency is missing.

3. A system embodying analog or digital techniques for measuring the nonambiguous speed of targets by means of pulsed radar comprising the circuit comprising a coherent memory filter which comprises a closed loop arrangement of an adder, a first and second delay line, an amplifier and a mixer, a saw tooth generator, a third delay line one end of which is connected between the adder and said first delay line; the other end of which is connected to said saw tooth generator, a first and second square wave signal generator, said first square wave signal generator having one end connected between said first and second delay lines and the other end connected to said saw tooth generator and said second square wave signal generator, and a branch comprising in series a differential circuit and said second square wave signal generator, the end of said branch connected to said differential circuit being connected to said saw tooth generator and the other end being connected to both said saw tooth generator and said first square wave signal generator.

References Cited

UNITED STATES PATENTS

| | | | |
|---|---|---|---|
| 3,015,819 | 1/1962 | Thourel | 343—7.7 |
| 3,018,477 | 1/1962 | Brault et al. | 343—7.7 |
| 3,120,659 | 2/1964 | Wells et al. | 343—7.7 |
| 3,165,738 | 1/1965 | Eastwood et al. | 343—7.7 |

RODNEY D. BENNETT, *Primary Examiner.*

C. L. WHITHAM, *Assistant Examiner.*